(12) United States Patent
Mori

(10) Patent No.: US 9,836,010 B2
(45) Date of Patent: Dec. 5, 2017

(54) VIBRATION-TYPE DRIVING APPARATUS, ROBOT, AND IMAGE FORMING APPARATUS

(71) Applicant: CANON KABUSHIKI KAISHA, Tokyo (JP)

(72) Inventor: Takao Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 264 days.

(21) Appl. No.: 14/249,149

(22) Filed: Apr. 9, 2014

(65) Prior Publication Data

US 2014/0305247 A1    Oct. 16, 2014

(30) Foreign Application Priority Data

Apr. 12, 2013  (JP) ................................. 2013-083509
Mar. 3, 2014   (JP) ................................. 2014-040847

(51) Int. Cl.
| H02N 2/10 | (2006.01) |
| --- | --- |
| G03G 15/00 | (2006.01) |
| B25J 9/12 | (2006.01) |
| H02N 2/00 | (2006.01) |
| H02N 2/16 | (2006.01) |

(52) U.S. Cl.
CPC .............. *G03G 15/757* (2013.01); *B25J 9/12* (2013.01); *H02N 2/0055* (2013.01); *H02N 2/163* (2013.01); *Y10T 74/20329* (2015.01)

(58) Field of Classification Search
CPC ......... H02N 2/103; H02N 2/026; H02N 2/163
USPC ......................................... 310/323.02, 323.09
See application file for complete search history.

(56) References Cited

U.S. PATENT DOCUMENTS

| 4,692,651 | A | * | 9/1987 | Hiramatsu | ............. | H02N 2/163 |
| --- | --- | --- | --- | --- | --- | --- |
|  |  |  |  |  |  | 310/323.09 |
| 5,313,132 | A | * | 5/1994 | Nakanishi | ............. | H02N 2/163 |
|  |  |  |  |  |  | 310/323.05 |
| 6,100,622 | A | * | 8/2000 | Yamamoto | ............... | H02N 2/14 |
|  |  |  |  |  |  | 310/316.01 |
| 6,140,741 | A |  | 10/2000 | Tamai |  |  |
| 6,201,338 | B1 | * | 3/2001 | Naito | ..................... | H02N 2/163 |
|  |  |  |  |  |  | 310/323.04 |
| 2008/0174206 | A1 | * | 7/2008 | Sakamoto | ............. | H02N 2/004 |
|  |  |  |  |  |  | 310/323.09 |

(Continued)

FOREIGN PATENT DOCUMENTS

| JP | 7-135783 A | 5/1995 |
| --- | --- | --- |
| JP | 8-2186 B2 | 1/1996 |

(Continued)

*Primary Examiner* — Bryan Gordon
(74) *Attorney, Agent, or Firm* — Canon USA, Inc. IP Division

(57) ABSTRACT

The present invention relates to a vibration-type driving apparatus including a vibrator including an electro-mechanical transducer; a driven body disposed in pressure-contact with the vibrator; a supporting portion extending from the vibrator; a base to which the vibrator is fixed with the supporting portion interposed therebetween; a vibration absorber disposed between the supporting portion and the base; and a compressive-force adjusting device capable of adjusting a compressive force to be applied to the vibration absorber between the supporting portion and the base.

20 Claims, 13 Drawing Sheets

(56) References Cited

U.S. PATENT DOCUMENTS

| | | | | |
|---|---|---|---|---|
| 2009/0207512 A1* | 8/2009 | Morioke | ............ | G02B 27/0006 359/824 |
| 2011/0037348 A1* | 2/2011 | Sakamoto | ............... | F16C 29/04 310/323.02 |
| 2013/0141717 A1* | 6/2013 | Nishimura | .......... | H01L 41/0926 356/244 |

FOREIGN PATENT DOCUMENTS

| | | |
|---|---|---|
| JP | 9-98586 A | 4/1997 |
| JP | 2009-142142 A | 6/2009 |
| JP | 2011-176067 A | 9/2011 |

* cited by examiner

VIBRATION-TYPE DRIVING APPARATUS, ROBOT, AND IMAGE FORMING APPARATUS

BACKGROUND OF THE INVENTION

Field of the Invention

The present invention relates to a vibration-type driving apparatus, and in particular, to a configuration including a vibration absorber in a vibration-type driving apparatus that excites vibrations in a vibrator to give a driving force using the vibration energy.

Description of the Related Art

In general, vibration-type driving apparatuses (for example, ultrasonic motors) include a vibrator in which a driving vibration is excited and a driven body that is in pressure-contact with the vibrator, in which the vibrator and the driven body are moved relative to each other using the driving vibration.

What is called an annular vibration-type driving apparatus of such vibration-type driving apparatuses will be described hereinbelow with reference to FIGS. 10 and 11.

FIG. 10 is a cross-sectional view showing the overall configuration of an annular motor. A driven body 2 is in pressure-contact with a vibrator 1 with a pressure spring 3 to generate a frictional force. Reference sign 6 denotes a base.

This frictional force acts as a driving force to drive the driven body 2. The rotational torque of the driven body 2 is transmitted to a shaft 5 via the pressure spring 3 and a disk 4.

FIG. 11 is a perspective view of the annular vibrator 1. The vibrator 1 includes an elastic member 101, a piezoelectric device 102 fixed to one surface of the elastic member 101, and a friction member 103 provided on the other surface of the elastic member 101. A plurality of protrusions 1a are arrayed in the form of saw teeth on the friction member 103 side of the elastic member 101.

The piezoelectric device 102 has an electrode pattern and a power supply unit (not shown), which causes the vibrator 1 to generate a bending vibration in an out-of-plane direction by the application of an alternating signal to the electrode pattern. This causes a high-frequency fine feed motion in the frictional contact surface of the vibrator 1 to drive the driven body 2.

The vibrator 1 has a supporting portion 104 extending from the vicinity of a neutral plane of the out-of-plane bending vibration of the elastic member 101 toward the inner circumference thereof. The supporting portion 104 is placed on the base 6 and is then fixed thereto by caulking.

For such an annular vibration-type driving apparatus, Japanese Patent Publication No. 8-2186 proposes a vibration wave motor shown in FIG. 12 in which an energy loss due to friction between a driving body and an absorber 7 is reduced to enhance the efficiency of the vibration wave motor.

FIG. 12 is a cross-sectional view of the annular vibrator, which has a supporting portion 104 around the outer circumference of an elastic member 101, the lower surface of which is supported by the vibration absorber 7.

By supporting the vibrator 1 with the absorber 7, the solid-borne propagation of a driving vibration generated in the vibrator 1 to an external device can be blocked, and undesired vibrations other than the driving vibration can be suppressed by the damping effect of the absorber 7.

In the case of FIG. 12, since the supporting portion 104 extends from the vicinity of the neutral plane of the out-of-plane direction bending vibration of the elastic member 101, an energy loss due to the friction between the supporting portion 104 and the absorber 7 can be reduced, and thus, an influence on the driving-vibration generation efficiency can be reduced.

To stably obtain the function and effect of the absorber 7 in the vibration wave motor in the related art, as described above, it is necessary to exert an appropriate compressive force to keep the absorber under sufficient strain. However, the related-art example does not give high satisfaction in obtaining a sufficient compressive force.

For example, even with the above configuration of the absorber under the configuration shown in FIG. 10, only an insufficient compressive force can be given by a motor pressing force that the pressure spring 3 generates and the holding force of the caulked portion of the base 6.

Furthermore, caulking causes variations in fixing strength and irregularity depending on positions, resulting in difficulty in stable production.

SUMMARY OF THE INVENTION

In contrast, an aspect of the present disclosure relates to a vibration-type driving apparatus including a vibration absorber, between a supporting portion of the vibrator and a base, that suppresses at least one of solid-borne propagation of vibrations excited by a vibrator to an external device and generation of undesired vibrations, in which the vibration absorber can be functioned with more stability to enhance the driving efficiency.

An aspect of the present disclosure relates to a vibration-type driving apparatus including a vibrator including an electro-mechanical transducer and a driven body disposed in pressure-contact with the vibrator. The vibration-type driving apparatus frictionally drives the driven body using vibration waves excited in the vibrator by application of an alternating signal to the electro-mechanical transducer, thereby moving the driven body relative to the vibrator.

The vibration-type driving apparatus includes a supporting portion extending from the vibrator; a base to which the vibrator is fixed, with the supporting portion interposed therebetween; a vibration absorber disposed between the supporting portion and the base; and a compressive-force adjusting device capable of adjusting a compressive force to be applied to the vibration absorber between the supporting portion and the base.

Further features of the present invention will become apparent from the following description of exemplary embodiments with reference to the attached drawings.

DESCRIPTION OF THE EMBODIMENTS

Embodiments of the present invention will be described hereinbelow.

EMBODIMENTS

First Embodiment

An example configuration of a vibration-type driving apparatus according to a first embodiment of the present invention will be described.

The vibration-type driving apparatus of the first embodiment includes a vibrator having an electro-mechanical transducer and a driven body that is in pressure-contact with the vibrator.

The vibration-type driving apparatus is configured to frictionally drive the driven body using vibration waves excited in the vibrator by application of an alternating signal to the electro-mechanical transducer, thereby moving the driven body relative to the vibrator. In other words, the vibration-type driving apparatus is configured such that the relative position of the driven body and the vibrator is changed by vibration waves excited in the vibrator by application of an alternating signal to the electro-mechanical transducer.

Figure 10:
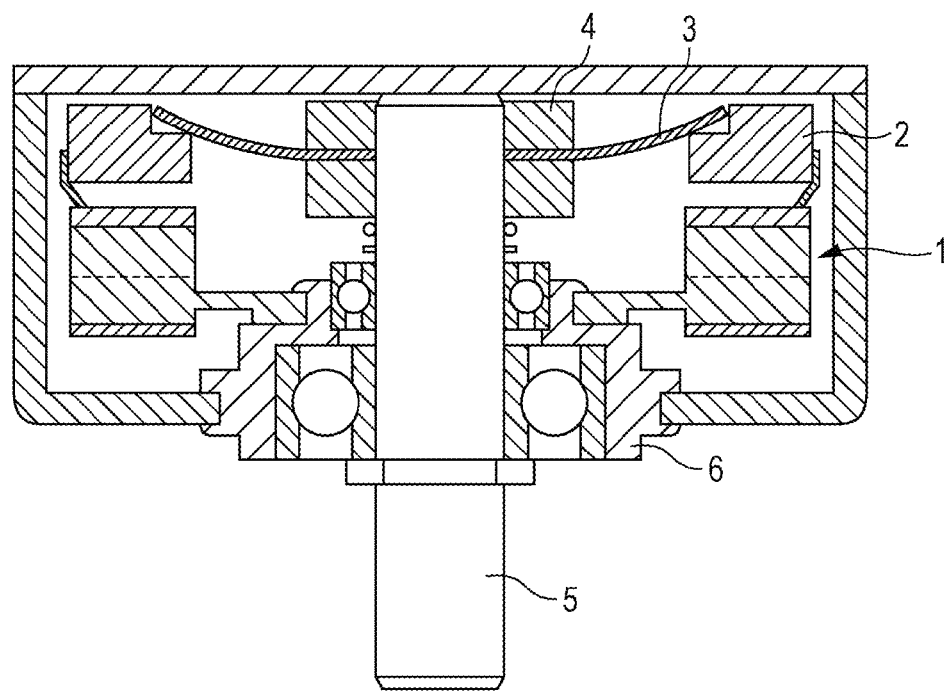
FIG. 10 is a cross-sectional view an annular motor.
Figure 11:
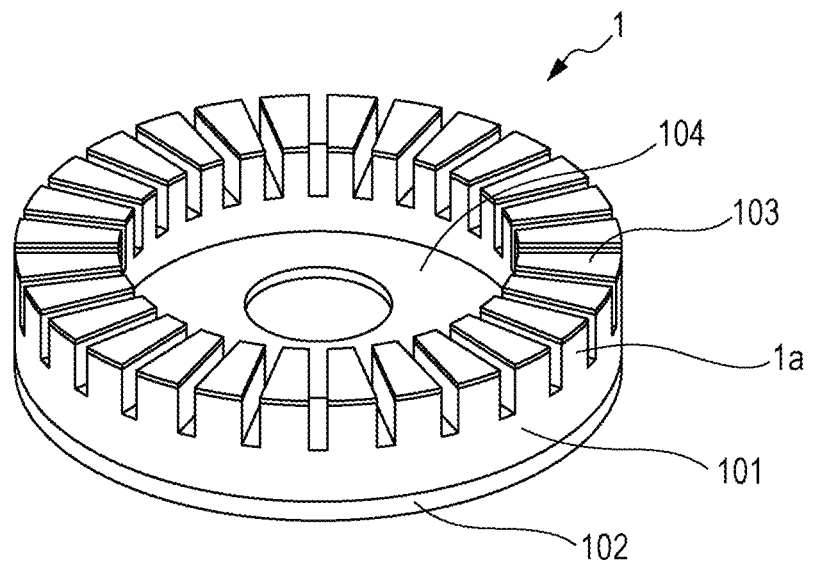
FIG. 11 is a perspective view of an annular vibrator.
Figure 12:
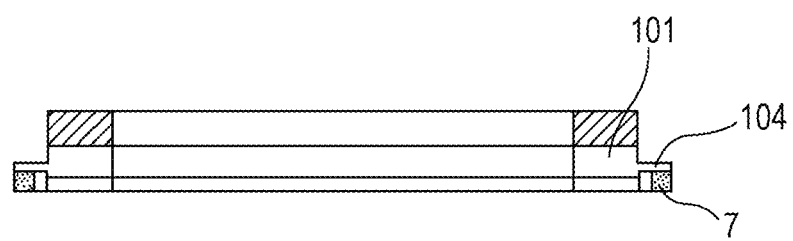
FIG. 12 is a cross-sectional view of the annular vibrator.

Specifically, the vibration-type driving apparatus of the first embodiment will be described using the annular vibration-type driving apparatus shown in FIG. 10, described above, as an example.

Figure 1:
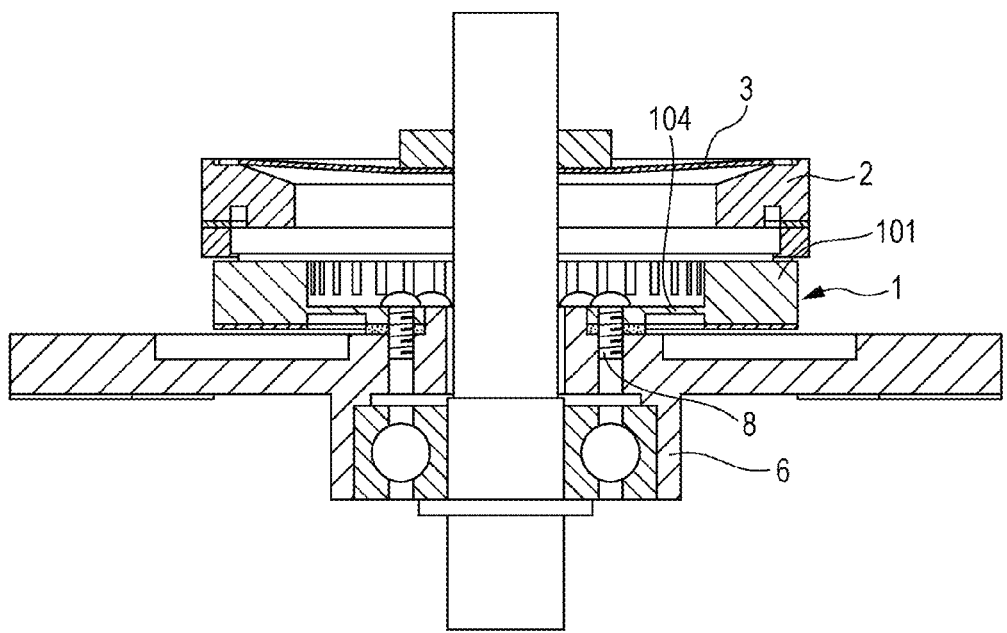
FIG. 1 is a diagram illustrating an example configuration of a vibration-type driving apparatus.

In FIG. 1, a driven body 2 is brought into pressure-contact with a vibrator 1 by a pressure spring 3 to generate a frictional force.

This frictional force serves as a driving force to drive the driven body 2.

The vibrator 1 has a supporting portion 104 extending from the vicinity of a neutral plane of the out-of-plane bending vibration of an elastic member 101.

The vibrator 1 is placed on a base 6 and is fixed by a plurality of fixing screws 8 around the inner circumference of the elastic member 101.

Figure 2:
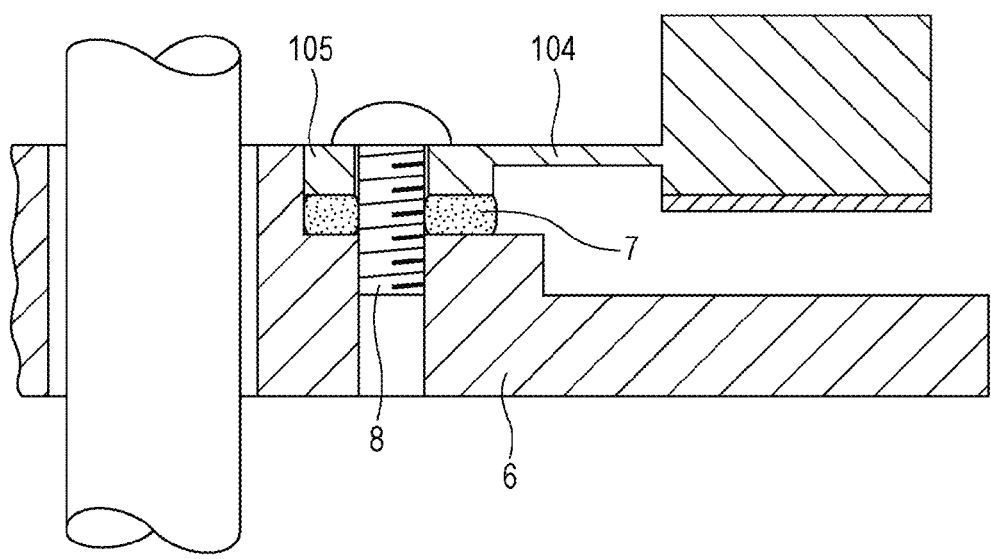
FIG. 2 is an enlarged view of the vicinity of a vibrator fixing portion of the vibration-type driving apparatus.

FIG. 2 is an enlarged view of the vicinity of the fixing portion in FIG. 1.

Of the supporting portion 104, a slightly thick portion fixed with the fixing screws 8 is referred to as a vibrator fixing portion 105.

An elastic vibration absorber 7 is provided between the vibrator fixing portion 105 and the base 6. The vibrator fixing portion 105 and the vibration absorber 7 are tightened together in the axial direction with the common fixing screws 8. The tightening causes deformation of the vibration absorber 7 under an axial compressive stress.

It is generally well known that the compressive force that the vibration absorber 7 receives at that time depends on the tightening torque, number, kind, and specifications of the fixing screws 8, the material of a tightening tool used, and so on.

In the configuration of the first embodiment, the fixing screws 8 are configured to be able to adjust the axial compressive force, allowing the compressive force for the vibration absorber 7 to be controlled by the fixing screws 8 by determining conditions from the tightening torque and the increased number of tightening of the fixing screws 8, a tightening tool used, and so on.

In other words, the axial compressive force for the vibration absorber between the supporting portion 104 and the base 6 is adjusted and the amount of deformation of the vibration absorber 7 is controlled by the fixing screws 8 serving as a fixing unit capable of adjusting the compressive force, whereby the fixing screws 8 serve as compressive-force adjusting devices.

Note that the inner-circumference side of the vibrator fixing portion 105 is in a fitted relationship with the base 6.

The amount of deformation of the vibration absorber 7 under the compressive stress tends to vary in the circumferential direction depending on the order of tightening of the plurality of fixing screws 8, an error in the thickness of the vibration absorber 7, an offset thereof, and so on.

The fitted relationship is set such that the vibrator 1 is horizontal relative to the uneven deformation of the vibration absorber 7, that is, parallel to the base 6.

Here, the reason that the vibration absorber 7 is disposed in the present invention will be described with experimental findings.

Figure 3:
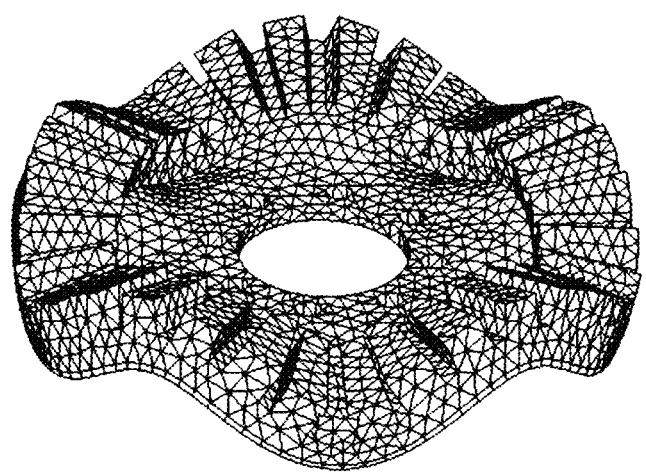
FIG. 3 is a diagram illustrating an example of an out-of-plane vibration mode of the driving vibration of the vibration-type driving apparatus.

First, the vibrator 1 of the first embodiment is driven in an out-of-plane vibration mode in which the amplitude is mainly in an out-of-plane direction (or an axial direction) as shown in FIG. 3.

FIG. 3 illustrates a bending vibration of the elastic member 101 of the vibrator 1 having five crests in the circumferential direction at the same time, that is, a fifth-order out-of-plane vibration.

Figure 4:
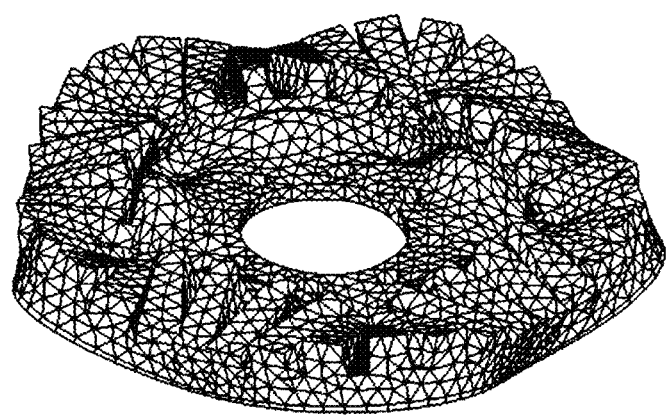
FIG. 4 is a diagram illustrating an example of an in-plane vibration mode, which is other than the driving vibration of the vibration-type driving apparatus.

An example of a vibration mode that is not used for driving and is desirably not excited during driving is shown in FIG. 4.

This is an in-plane vibration mode in which the elastic member 101 generates a vibration of amplitude mainly in an in-plane direction (or in a radial direction).

This is a fifth-order in-plane vibration having five crests in the circumferential direction as viewed from the ends of the protrusions 1a of the vibrator 1.

In FIGS. 3 and 4, the supporting portion 104 of the vibrator 1 extends from the vicinity of the neutral plane of the out-of-plane vibration of the elastic member 101 toward the inner circumference.

The vibration generation states of the supporting portion 104 in both vibration modes are compared.

In the out-of-plane vibration in FIG. 3, the amplitude partly increases at the outer circumference of the supporting portion 104 adjacent to the elastic member 101. The vibrator 1 vibrates little in the vicinity of the vibrator fixing portion 105.

In contrast, for the in-plane vibration in FIG. 4, the amplitude increases in the vicinity of the elastic member 101 as in FIG. 3, and increases relatively also in the vicinity of the vibrator fixing portion 105.

If the vibrator fixing portion 105 is mounted on the base 6 with the vibration absorber 7 therebetween, the vibration generation states change due to the damping performance of the vibration absorber 7.

Figure 5:
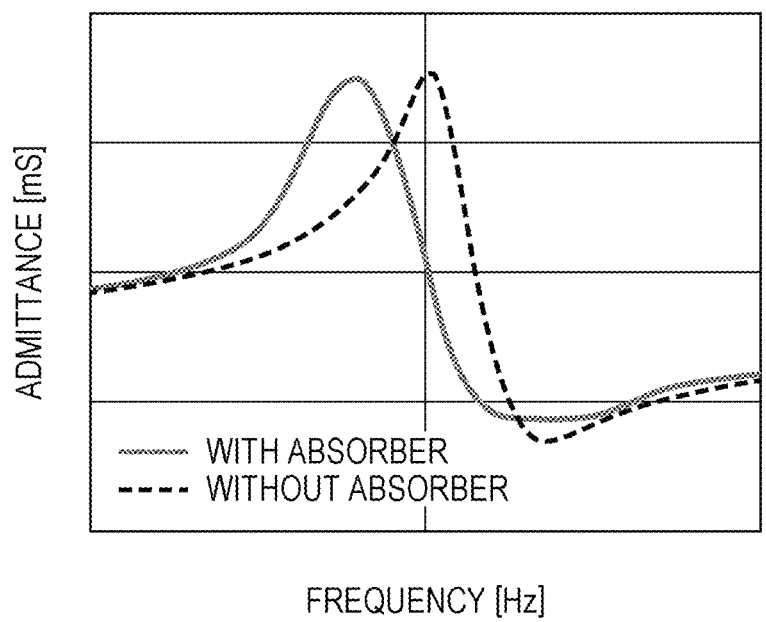
FIG. 5 is a graph illustrating changes in the frequency response curves in the out-of-plane vibration mode depending on whether the vibration-type driving apparatus has an absorber.
Figure 6:
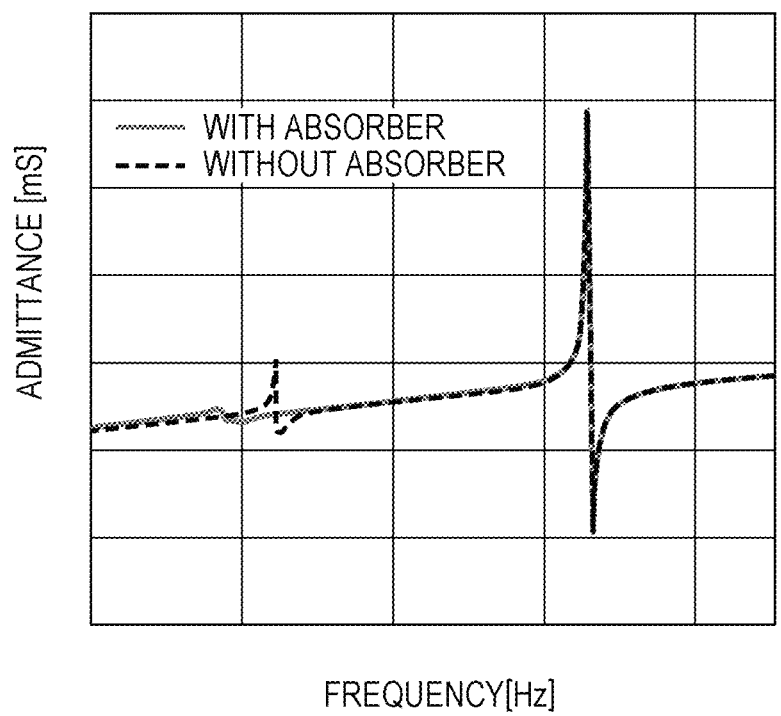
FIG. 6 is a graph illustrating changes in frequency response curves in the out-of-plane vibration mode and the in-plane vibration mode depending on whether the vibration-type driving apparatus has an absorber.

FIGS. 5 and 6 are graphs of the experimental results of the changes, both showing the electrical frequency response characteristics of the vibrator 1. The horizontal axis represents the frequency of an alternating signal input to an electro-mechanical transducer, and the vertical axis represents admittance.

FIG. 5 shows response curves of out-of-plane vibrations. This shows that the mechanical quality factor Q of the vibrator 1 changes little even with the vibration absorber 7. The reason is that the amplitude of the vibration of the vibrator fixing portion 105 in contact with the vibration absorber 7 acting as a damper is sufficiently small.

In contrast, FIG. 6 shows response curves of an out-of-plane vibration and an in-plane vibration measured in a wide frequency range to find the difference therebetween. The peak in the right half of the graph in which the admittance is high is an out-of-plane vibration.

The small peak in the left half of the graph without the vibration absorber 7 is an in-plane vibration, which rarely appeared as an electrical response in the presence of the vibration absorber 7.

Figure 7:
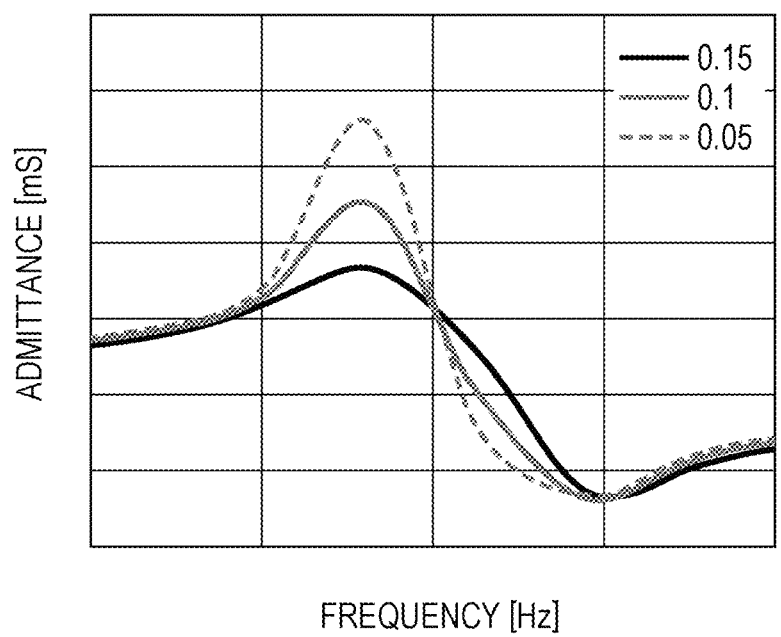
FIG. 7 is a graph illustrating changes in the frequency response curve in the in-plane vibration mode depending on the strain of the absorber in the vibration-type driving apparatus.

FIG. 7 shows response curves of in-plane vibrations measured in a small frequency range in the vicinity of peaks in the case where the vibration absorber 7 is disposed.

Here, three kinds of strain of the vibration absorber 7 are compared.

The amount of the vibration absorber 7 was adjusted using the tightening torque of the fixing screws 8 for fixing the vibrator 1. This shows that the damping effect of the vibration absorber 7 increases to decrease the admittance as the strain of the vibration absorber 7 increases, resulting in a smoother response curve.

Thus, fixing the vibrator 1 to the base 6 at the inner circumference side of the vibrator 1, particularly, at the vibrator fixing portion 105 on the innermost circumference side, via the vibration absorber 7 has the effect of reducing the in-plane vibration and so on without exerting a significant influence on the out-of-plane vibration mode for use in driving.

Furthermore, the effect is small if the strain of the vibration absorber 7 is small; increasing the tightening torque of the fixing screws 8 to increase the compressive force will give a sufficient damping effect.

Specifically, it is desirable to set the compressive strain using the fixing screws 8 to 0.1 or more, that is, to the amount of deformation more than 10% of the thickness of the vibration absorber 7. This can enhance the function and effect of the vibration absorber 7.

For the material of the vibration absorber 7, it should be supposed that the vibration-type driving apparatus is used under wide temperature condition depending on the driving condition and installation environment.

The first embodiment adopts silicone rubber for the reason that it has stable mechanical property in a wide temperature range. In particular, the loss factor of silicone rubber changes little in the environment of −20° C. to 80° C., which common for consumer equipment, thus stably damping vibration modes other than the driving vibration.

Furthermore, silicone rubber has a small compression set. Although the compression set of silicone rubber gradually increases at higher temperatures of 100° C. or higher and at lower temperatures of −40° C. or lower, it changes a little in a much wider temperature range than that of other organic rubbers.

Furthermore, since vibration-type driving apparatuses significantly change in motor temperature due to driving conditions, such as driving and stopping, silicone rubber having high heat resistance and cold resistance and significantly small temperature dependency in various mechanical properties has a great advantage over the other rubbers. In other words, the vibration absorber 7 is made of a material having elasticity to suppress at least one of solid-borne propagation of vibrations excited by the vibrator 1 to an external device and generation of undesired vibrations.

The above configuration of the first embodiment can stably provide necessary compressive force to the vibration absorber 7 to reduce an energy loss due to the friction between the vibrator 1 and the vibration absorber 7, thereby decreasing an influence on the driving-vibration generation efficiency.

In other words, the configuration can suppress at least one of solid-borne propagation of vibrations excited by the vibrator 1 to an external device and generation of undesired vibrations. Accordingly, the configuration can reduce a loss while the vibration-type driving apparatus is in operation, thereby enhancing the efficiency.

Furthermore, the vibration-type driving apparatus can be mounted to an external device without the need for a special design. This allows even a user who has no expert knowledge to install the vibration-type driving apparatus worry-free.

Second Embodiment

Figure 8:
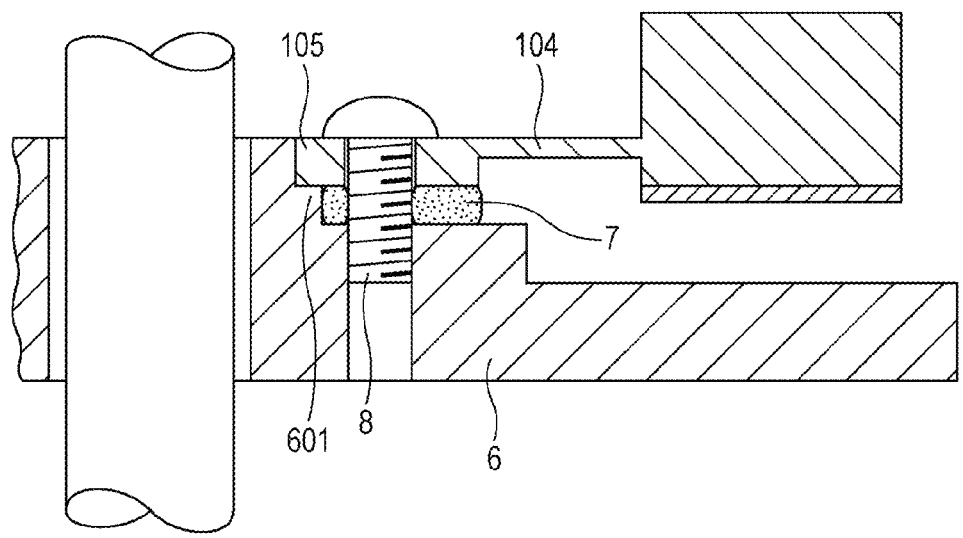
FIG. 8 is an enlarged view of the vicinity of a vibrator fixing portion of a vibration-type driving apparatus.

FIG. 8 is a cross-sectional view illustrating a second embodiment of the present invention.

Of the supporting portion 104, a slightly thick portion fixed with the fixing screws 8 is referred to as a vibrator fixing portion 105.

An elastic vibration absorber 7 is provided between the vibrator fixing portion 105 and the base 6. The vibrator fixing portion 105 and the vibration absorber 7 are tightened together in the axial direction with common fixing screws 8.

The tightening causes deformation of the vibration absorber 7 under an axial compressive stress.

Increasing the tightening torque for the fixing screws 8 brings the vibrator fixing portion 105 of the vibrator 1 closer to the base 6 to bring the surface of the vibrator fixing portion 105 adjacent to the base 6 into contact with a step portion 601 of the base 6.

In this way, an axial compressive stress is applied to the vibration absorber 7 with the fixing screws 8 serving as compressive-force adjusting devices to bring the vibration absorber 7 into contact with the step portion 601 serving as a vibrator positioning portion, thereby determining the axial position of the vibrator fixing portion 105.

The determination of the axial position of the vibrator 1 allows the amount of deformation of the vibration absorber 7 to be controlled.

A modification example of the step portion 601 functioning as a vibrator positioning portion may be a separate component. The amount of deformation due to the axial compression of the material of the separate component can be smaller than that of the vibration absorber 7, in other words, the axial rigidity can be larger than that of the vibration absorber 7. Accordingly, in addition to metal, plastic materials, such as Teflon®, and a rubber ring having high axial rigidity performs the same function.

Next, the position of the step portion 601 will be described.

First, the configuration of the second embodiment allows the vibration absorber 7 to have the same damping performance as in the first embodiment.

On the other hand, in the second embodiment, driving vibrations propagate through the step portion 601 in addition to the fixing screws 8 to an external device.

Figure 9:
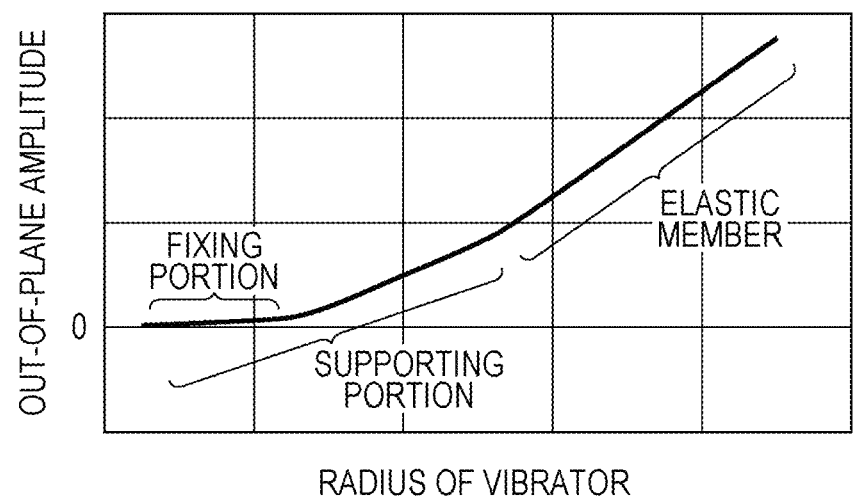
FIG. 9 is a graph showing an out-of-plane direction amplitude distribution of a vibrator supporting portion due to a driving vibration in the out-of-plane vibration mode of the vibration-type driving apparatus.

FIG. 9 shows an out-of-plane direction amplitude distribution of the vibrator supporting portion 104 due to a driving vibration in an out-of-plane vibration mode.

The horizontal axis represents the radius of the vibrator 1. FIG. 9 shows that the supporting portion 104 generates a substantially cantilever-beam shaped bending vibration with its distal end at the outermost circumference of the ring-shaped elastic member 101 and with the fulcrum in the vicinity of the inner-circumference-side vibrator fixing portion 105.

The elastic member 101 vibrates with larger amplitudes in the out-of-plane direction to push up the driven body 2. The amplitude of the out-of-plane vibration decreases gradually in the thick-wall portion of the supporting portion 104 to reach substantially zero in the vicinity of the vibrator fixing portion 105. Therefore, the step portion 601 is disposed in the vicinity of the innermost circumference in the vibrator fixing portion 105 so that solid-borne propagation does not occur in the contact surface of the vibrator positioning portion.

Furthermore, since the vibration absorber 7 is interposed between the supporting portion 104 and the base 6 on the periphery tightened with the fixing screws 8, solid-borne propagation through the fixing screws 8 hardly occurs.

In contrast, the step portion 601 has no absorber interposed between it and the base 6, so that more pronounced solid-borne propagation occurs than at the screw positions. Therefore, the vibrator positioning portion can be disposed inside the fixing screws 8 serving as compressive-force adjusting devices, that is, a position more distant from the electro-mechanical transducer serving as a vibration generating portion.

The inner circumferential surface of the vibrator fixing portion 105 fitted to the base 6 has little influence in terms of solid-borne propagation.

The reason is that since the supporting portion 104 supports the neutral plane of the out-of-plane bending vibration of the elastic member 101, the in-plane direction component of the driving vibration is hardly propagated to the vibrator fixing portion 105.

In the above description, strictly, extremely small vibrations remain in the out-of-plane direction and the in-plane direction even around the inner circumferential end of the supporting portion 104.

Leakage of such extremely small vibrations to an external device due to solid-borne propagation and other problems may be coped with separately.

Third Embodiment

In this embodiment, example apparatuses incorporating a vibration-type driving apparatus will be described with reference to FIGS. 13 to 16. The apparatuses illustrated in FIGS. 13 to 16 may incorporate, for example, the vibration-type driving apparatus described in the first or second embodiment.

Figure 13:
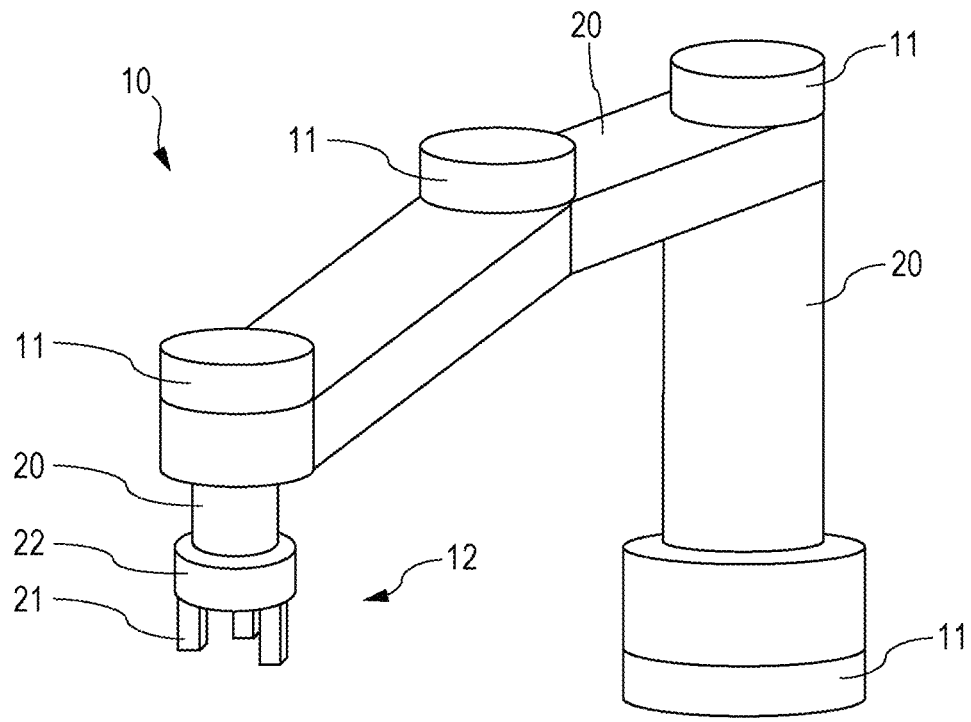
FIG. 13 is a perspective view of a robot incorporating a vibration-type driving apparatus.

FIG. 13 is a perspective view of a robot incorporating a vibration-type driving apparatus, showing a horizontal, articulated robot 10, which is a kind of industrial robot.

In FIG. 13, the vibration-type driving apparatus is built in arm joints 11 and a hand portion 12. The arm joints 11 are provided between arms 20 and are connected to the arms 20. The hand portion 12 includes a holder 21 and a hand joint 22 provided between the holder 21 and one of the arms 20. The hand joint 22 is connected to the holder 21 and the arm 20. The vibration-type driving apparatus may be used in the arm joints 11 and the hand joint 22. The vibration-type driving apparatus is suitable for bending the arm joints of robots and for the holding operation of the hand portion because low rotational-speed and high torque motor output are generally required.

Figure 14:
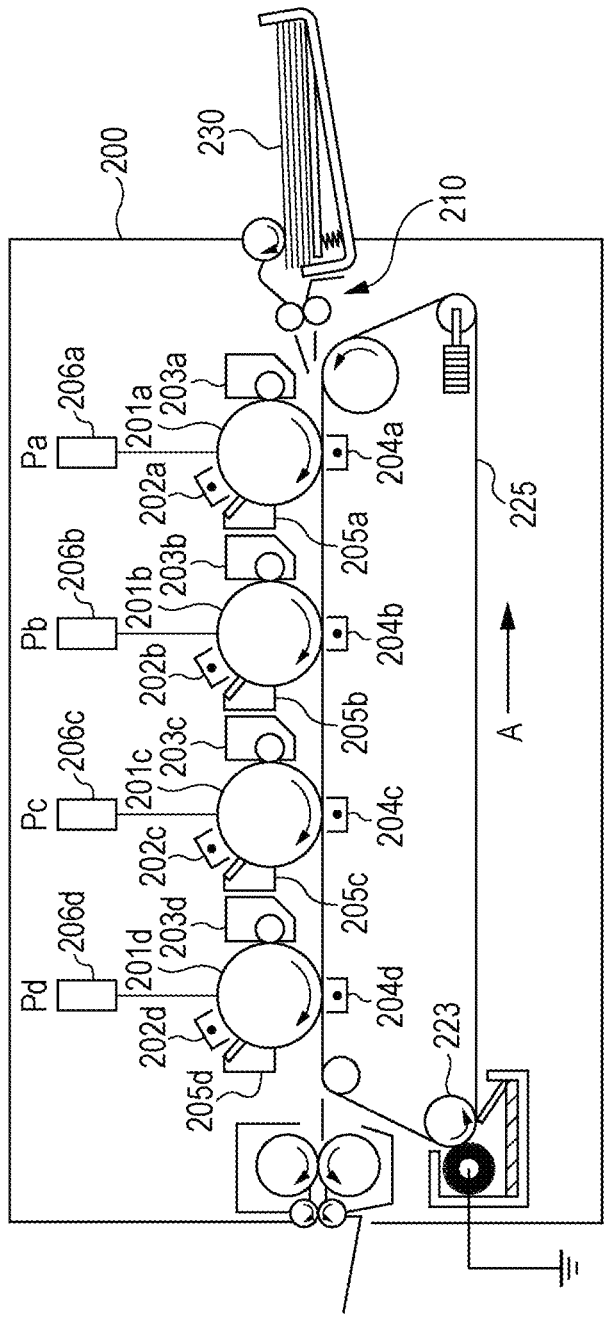
FIG. 14 is a sectional side view of the internal configuration of a color-image forming apparatus incorporating a vibration-type driving apparatus.

FIG. 14 is a sectional side view of the internal configuration of a color-image forming apparatus incorporating a vibration-type driving apparatus, showing an image processing apparatus 200 including four image forming units Pa, Pb, Pc, and Pd by way of example.

The image forming units Pa, Pb, Pc, and Pd substantially have the same configuration and have photosensitive drums 201a, 201b, 201c, and 201d serving as image bearing members, respectively. Charging units 202a, 202b, 202c, and 202d for uniformly charging the photosensitive drums 201a, 201b, 201c, and 201d are provided around the photosensitive drums 201a, 201b, 201c, and 201d, respectively. Furthermore, the image forming units Pa, Pb, Pc, and Pd include, around the photosensitive drums 201a to 201d, developing units 203a, 203b, 203c, and 203d that develop static latent images formed on the photosensitive drums 201a to 201d, transferring charging units 204a, 204b, 204c, and 204d that transfer the developed images to a transfer material 230, cleaning units 205, 205b, 205c, and 205d that remove toner remaining on the photosensitive drums 201a to 201d, which are disposed in sequence in the rotating direction of the photosensitive drums 201a to 201d. Furthermore, exposure units 206a, 206b, 206c, and 206d are provided above the individual photosensitive drums 201a to 201d.

A conveying belt 225 is driven in the direction of arrow A shown in FIG. 14 by a drive roller 223 to constitute a conveying unit that bears the transfer material 230 fed by a feeding unit 210 and that conveys the transfer material 230 to the individual image forming units Pa to Pd. In FIG. 14, the vibration-type driving apparatus is used as a drive motor for rotating the photosensitive drums 201a to 201d. The vibration-type driving apparatus is also used as a drive motor for rotating the drive roller 223 for driving the conveying belt 225.

Figure 15:
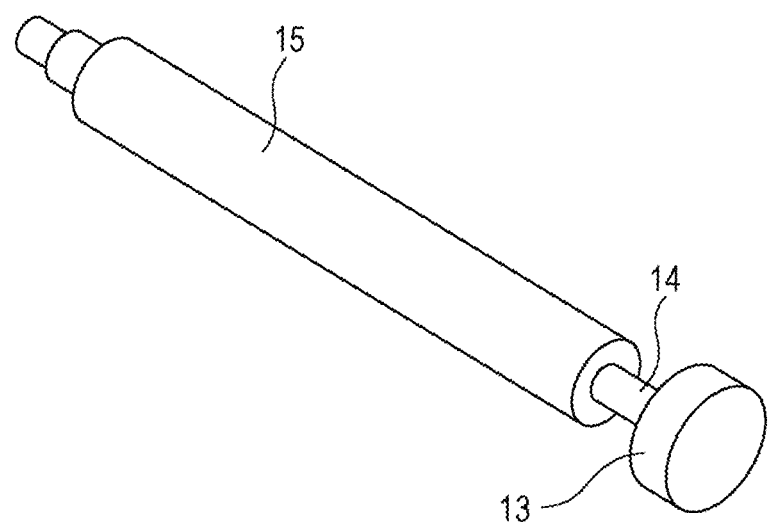
FIG. 15 illustrates a configuration in which a vibration-type driving apparatus is mounted to drive a photosensitive drum.

FIG. 15 illustrates a configuration in which a vibration-type driving apparatus is mounted to drive a photosensitive drum. A vibration-type driving apparatus 13 can be directly connected to a drive shaft 14 of a photosensitive drum 15. Since this can eliminate the need for a speed reduction unit, such as a gear, which is needed in the related art, reduction in color shift can be achieved, thus enhancing the print quality.

Figure 16:
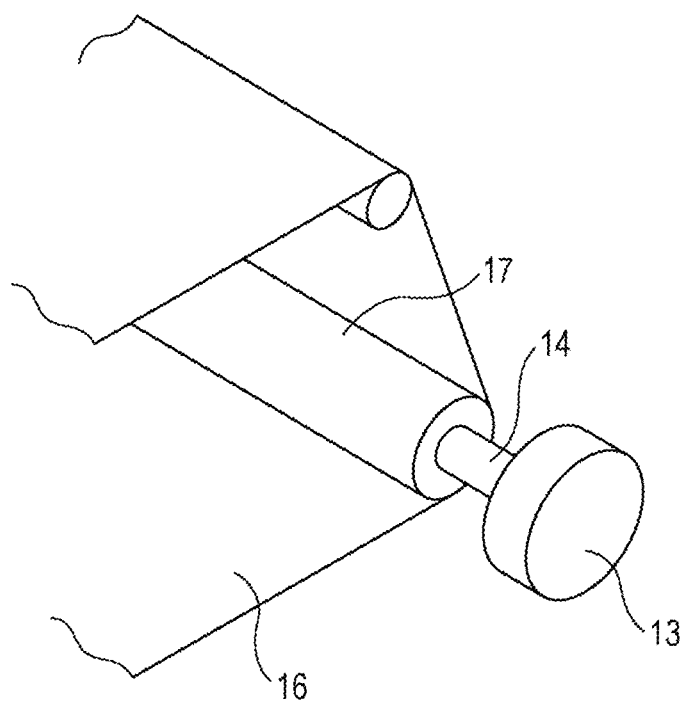
FIG. 16 illustrates a configuration in which a vibration-type driving apparatus is mounted to drive a conveying belt.

FIG. 16 illustrates a configuration in which a vibration-type driving apparatus is mounted to drive a conveying belt. In FIG. 16, the vibration-type driving apparatus 13 can be directly connected to the drive shaft 14 of a drive roller 17. This can also enhance the print quality in driving the conveying belt 16, as for the photosensitive drum 15.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-083509, filed Apr. 12, 2013, and No. 2014-040847, filed Mar. 3, 2014, which are hereby incorporated by reference herein in their entirety.

What is claimed is:

1. A vibration-type driving apparatus comprising:
a vibrator including an electro-mechanical transducer;
a driven body disposed in contact with the vibrator;
a supporting portion extending from the vibrator;
a base to which the vibrator is fixed, with the supporting portion interposed therebetween;
a vibration absorber disposed between the supporting portion and the base;
a compressive-force adjusting device configured to adjust a compressive force to be applied to the vibration absorber between the supporting portion and the base, and
a step portion provided in the base and in direct contact with a surface of the supporting portion on a base side or a member disposed in contact with the surface of the supporting portion of the base side between the supporting portion and the base and larger in rigidity than the vibration absorber.

2. The vibration-type driving apparatus according to claim 1, wherein the vibration absorber has elasticity so that generation of at least one of solid-borne propagation of a vibration excited by the vibrator to an external device and an undesired vibration is controlled.

3. The vibration-type driving apparatus according to claim 1, wherein the compressive-force adjusting device is configured to fix the vibrator to the base, with the supporting portion interposed therebetween.

4. The vibration-type driving apparatus according to claim 1, wherein
the vibrator is of an annular type;
the supporting portion extends to the inner circumference of the vibrator; and
the supporting portion is fixed to the base, with the vibration absorber interposed therebetween, by the compressive-force adjusting device.

5. The vibration-type driving apparatus according to claim 4, wherein an inner-circumference portion of the supporting portion is fixed to the base, with the vibration absorber interposed therebetween, by the compressive-force adjusting device.

6. The vibration-type driving apparatus according to claim 4, wherein the step portion or the member is disposed in a vicinity of an inner circumference side of a fixing portion.

7. The vibration-type driving apparatus according to claim 4, wherein the step portion or the member is disposed closer to the inner circumference of the vibrator than a position where the supporting portion is fixed to the base by the compressive-force adjusting device.

8. The vibration-type driving apparatus according to claim 1, wherein the vibration absorber is a silicone rubber.

9. The vibration-type driving apparatus according to claim 1, wherein the vibration absorber is deformed by 10% or more of a thickness thereof.

10. The vibration-type driving apparatus according to claim 1, wherein the relative position between the driven body and the vibrator is changed by a vibration wave excited by the vibrator by application of an alternating signal to the electro-mechanical transducer.

11. A robot comprising:
an arm; and
a joint connected to the arm,
wherein the joint includes the vibration-type driving apparatus according to claim 1.

12. The robot according to claim 11, further comprising:
a holder,
wherein the joint is further connected to the holder.

13. An image forming apparatus comprising:
an image bearing member;
a conveying belt opposed to the image bearing member; and
the vibration-type driving apparatus according to claim 1, the vibration-type driving apparatus being configured to drive at least one of the image bearing member and the conveying belt.

14. An image forming apparatus comprising:
an image bearing member;
a conveying belt opposed to the image bearing member; and
the vibration-type driving apparatus according to claim 1, the vibration-type driving apparatus being configured to drive the conveying belt.

15. The vibration-type driving apparatus according to claim 1, wherein in a case where the compressive force to be applied to the vibration absorber is adjusted by the compressive-force adjusting device as a result of a contact between the supporting portion and the member or of the supporting portion and the step portion, an amount of deformation of the vibration absorber is controlled.

16. The vibration-type driving apparatus according to claim 1, wherein the second portion contacting the base includes a step portion of the surface.

17. The vibration-type driving apparatus according to claim 1, further comprising a pressure member configured to apply a pressure force in between the vibrator and the driven body.

18. The vibration-type driving apparatus according to claim 1, wherein the member is in contact with the surface of the supporting portion on the base side and the base without the vibration absorber being interposed therebetween.

19. A vibration-type driving apparatus, comprising:
a vibrator including an electro-mechanical transducer;
a driven body disposed in contact with the vibrator;
a supporting portion extending from the vibrator;
a base to which the vibrator is fixed, with the supporting portion interposed therebetween;
a vibration absorber disposed between the supporting portion and the base; and
a compressive-force adjusting device configured to adjust a compressive force to be applied to the vibration absorber between the supporting portion and the base,
wherein the supporting portion is in direct contact with the vibrator absorber.

20. A vibration-type driving apparatus comprising:
a vibrator including an electro-mechanical transducer;
a driven body disposed in contact with the vibrator;
a supporting portion extending from the vibrator;
a base to which the vibrator is fixed, with the supporting portion interposed therebetween;
a vibration absorber disposed between the supporting portion and the base; and a compressive-force adjusting device configured to adjust a compressive force to be applied to the vibration absorber between the supporting portion and the base, wherein the supporting portion has a first portion and a second portion, wherein the vibration absorber is disposed between the supporting portion and the base on the first portion;

wherein a surface of the supporting on a base side and the base are in direct contact with each other, or the surface of the supporting portion on the base side and a member disposed between the supporting portion and the base are in contact with each other at the second portion, and wherein the member is larger in rigidity than the vibration absorber.

* * * * *